– – –

United States Patent [19]

Laurer

[11] 4,293,448

[45] Oct. 6, 1981

[54] PREPARATION OF A CATALYST CARRIER FROM ALUMINA MIXTURES

[75] Inventor: Peter R. Laurer, Ludwigshafen, Fed. Rep. of Germany

[73] Assignee: BASF Aktiengesellschaft, Fed. Rep. of Germany

[21] Appl. No.: 97,836

[22] Filed: Nov. 27, 1979

[30] Foreign Application Priority Data

Dec. 7, 1978 [DE] Fed. Rep. of Germany ....... 2852947

[51] Int. Cl.$^3$ ............................................ B01J 21/04
[52] U.S. Cl. ..................................... 252/463; 423/628
[58] Field of Search ................ 252/463; 423/626, 628

[56] References Cited

U.S. PATENT DOCUMENTS

| | | | |
|---|---|---|---|
| 1,913,938 | 6/1933 | Metzger et al. | 252/463 |
| 3,853,789 | 12/1974 | Warthen et al. | 252/477 R |
| 3,894,963 | 7/1975 | Gerdes et al. | 252/463 X |

*Primary Examiner*—W. J. Shine
*Attorney, Agent, or Firm*—Keil & Witherspoon

[57] ABSTRACT

A process for the preparation of a very hard catalyst carrier from a mixture of aluminum oxides which in addition to $\alpha$-$Al_2O_3$ contains other modifications, preferably $\gamma$-$Al_2O_3$. The $\alpha$-$Al_2O_3$ is first pretreated with an acid, base and/or metal salt solution and is then mixed with the other aluminum oxides or their intermediates.

4 Claims, No Drawings

PREPARATION OF A CATALYST CARRIER FROM ALUMINA MIXTURES

It is known to use aluminum oxide to prepare catalyst carriers and mixed catalysts. Various modifications of aluminum oxide exist, and are produced by dehydrating and subsequently heating the various aluminum hydroxides. Preferably, $\gamma$-$Al_2O_3$, $\eta$-$Al_2O_3$ and $\alpha$-$Al_2O_3$ are employed to prepare catalyst carriers or mixed catalysts.

Moldings containing $\alpha$-$Al_2O_3$ have previously been prepared by tableting or extruding an easily moldable hydrated aluminum oxide, eg. boehmite or bayerite, and then heating the moldings at an elevated temperature, preferably above 1000° C. This results in a mixture of the transition oxides, preferably $\theta$-$Al_2O_3$, H-$Al_2O_3$ and $\eta$-$Al_2O_3$, with $\alpha$-$Al_2O_3$. The proportion of $\alpha$-$Al_2O_3$ increases with increasing temperature. Above 1200° C., virtually only $\alpha$-$Al_2O_3$ is present. At the same time, the specific surface area, and the proportion of micro-pores, diminishes.

I have found that a very hard catalyst carrier can be prepared from a mixture of aluminum oxides which in addition to $\alpha$-$Al_2O_3$ contains other $Al_2O_3$ modifications, preferably $\gamma$-$Al_2O_3$, if $\alpha$-$Al_2O_3$ is pretreated with an acid, base and/or metal salt solution and subsequently mixed with the other hydrated aluminum oxides, after which the mixture is kneaded and extruded to form moldings.

In a particular embodiment of the process, the plastic kneaded mass required for molding is prepared by first kneading the $\alpha$-$Al_2O_3$ powder with an acid, base and/or metal salt solution as the peptizing agent and then adding the aluminum hydroxide and/or hydrated oxide, or their intermediates, required for the formation of the $\gamma$-$Al_2O_3$.

Moldings of $\alpha$-$Al_2O_3$ and $\gamma$-$Al_2O_3$ or $\chi$-$Al_2O_3$, or of $\alpha$-$Al_2O_3$ and transition oxides which do not require to be heated to a high temperature are prepared, for example, by pretreating $\alpha$-$Al_2O_3$, which is inherently inert and not moldable, with a solution which contains all of the peptizing agent which is normally required for plasticization. The peptizing agent with which the $\alpha$-$Al_2O_3$ is pretreated may be a metal nitrate solution containing excess nitric acid. The remaining constituents, namely $\gamma$-$Al_2O_3$, $\chi$-$Al_2O_3$, transition oxides or hydrated aluminum oxides, are then added, and the mixture is kneaded, with addition of the amount of water required for plasticization, and is then, in the conventional manner, extruded, dried and heated to a temperature which suffices to form the desired $Al_2O_3$ modification but not to form $\alpha$-$Al_2O_3$.

Instead of the $\gamma$-modification of the aluminum oxide, or instead of the mixture of this modification with other modifications, it is also possible to use intermediates from which the $\gamma$-$Al_2O_3$ is formed under the process conditions. Examples of suitable intermediates are the hydrated aluminum oxides and the hydroxides.

Suitable moldings produced by extrusion are cylinders, rings, extrudates of star-shaped cross-section, and spheres of diameter from about 1 to 30 mm.

To form the desired modification, the moldings are heated, for example for from 1 to 3 hours at from 500° C. to 1000° C. To form the $\gamma$-modification the material is heated, for example, to 500°–600° C.; heating at below 600° C. produces $\gamma$-$Al_2O_3$ or $\chi$-$Al_2O_3$, whilst above 1100° C. the thermodynamically stable $\alpha$-$Al_2O_3$ is produced.

The heat treatment furthermore changes the specific surface area, the distribution of pore radii, and the nature and number of hydroxyl groups on the surface of the $Al_2O_3$. These changes have a quite specific effect on the catalytic properties of the aluminum oxides.

When used in catalysts for heterogeneous catalysis in a fixed bed, the carriers are in most cases employed as particles of a particular shape and size, in order to conform to specific requirements regarding flow and diffusion in a catalyst-filled reaction vessel through which gases, vapors, liquids or mixtures of these flow.

Moldings of the mixtures according to the invention are prepared, for example, by tableting the dry powder mixture, with addition of a tableting assistant. A further method of preparation of the moldings is to extrude a paste which is capable of flow. For this purpose, the metal oxides or hydrated oxides are mixed with water, with or without addition of from 0.5 to 10 percent by weight of an acid, a base or a salt as the peptizing agent, and are kneaded, with application of shearing forces. The kneaded mixture is then extruded to bring it to the desired shape, preferably cylindrical or ring-shaped extrudates, and is dried.

Catalysts produced using these carriers may be employed, for example, for the following processes:

With nickel as the active component, for steam reforming of hydrocarbons, for methanization of CO, especially for gases rich in CO obtained from coal gasification, and for hydrogenation reactions.

With copper as the active component, for the Deacon process for the oxidation of HCl, and for the oxychlorination of ethylene and other hydrocarbons.

EXAMPLE 1

5,000 g of $\alpha$-$Al_2O_3$ powder are mixed in a paddle kneader with 1,500 ml of a nitric acid solution which contains 20% by weight of $HNO_3$. During mixing, the temperature rises from 20° C. to 30° C., and clod-like agglomerates are formed. After 30 minutes' kneading, 5,000 g of boehmite powder and a further 2,000 ml of water are added and the mixture is kneaded for 20 minutes. The kneaded mass is then molded in a hydraulic extruder to form extrudates of 5 mm diameter, which are dried at 120° C. and heated at 520° C. The mean hardness is 9 kg.

For comparison, extrudates or tablets are prepared from the same raw materials by the prior art method.

COMPARATIVE EXAMPLE 1a 5,000 g of $\alpha$-$Al_2O_3$ powder and 5,000 g of boehmite powder are mixed with one another and then with 3,500 ml of a nitric acid solution containing 8.6% by weight of $HNO_3$. In the course thereof, the temperature rises to 50° C. After 50 minutes' kneading, the kneaded material is molded in a hydraulic extruder to form cylindrical extrudates of 5 mm diameter, which are dried at 120° C. and heated at 520° C. The mean hardness is only 3.5 kg and is therefore, according to experience, insufficient to allow the material to be used in an industrial reactor.

COMPARATIVE EXAMPLE 1b 1,000 g of $\alpha$-$Al_2O_3$ powder and 1,000 g of boehmite powder are mixed thoroughly. Toward the end of the mixing process, 60 g of graphite are added as a tableting assistant. The mixture is molded on a tableting press to give cylindrical tablets of 5 mm diameter and 5 mm thickness, which are then heated at 520° C. The tablets disintegrate even under slight mechanical stress.

EXAMPLE 2

800 g of α-Al$_2$O$_3$ powder are kneaded for 30 minutes with 240 ml of a solution which contains 250 g of Ni-NO$_3$.6H$_2$O and 10 g of free nitric acid. 200 g of boehmite powder and a further 100 ml of water are then added and the mixture is kneaded for 20 minutes.

The kneaded mass is molded in a hydraulic extruder to give cylindrical extrudates of 5 mm diameter, which are dried at 120° C. and heated at 520° C. The mean hardness is 11 kg.

I claim:

1. A process for the preparation of a very hard catalyst carrier from a mixture of aluminum oxides which comprises pretreating α-Al$_2$O$_3$ with an acid, base and/or metal salt solution, mixing the pretreated α-Al$_2$O$_3$ with at least one member selected from the group consisting of γ-Al$_2$O$_3$, χ-Al$_2$O$_3$, transition oxides of aluminum or hydrated aluminum oxides, kneading the mixture with the addition of water, extruding the resulting mass and drying and heating the extrudate to form the desired catalyst carrier.

2. The process of claim 1 wherein the pretreated α-Al$_2$O$_3$ is mixed with γ-Al$_2$O$_3$.

3. The process of claim 1 wherein the pretreated α-Al$_2$O$_3$ is mixed with hydrated aluminum oxide, the mixture is kneaded with the addition of water, the resulting mass is extruded and dried and then heated to form the desired Al$_2$O$_3$ modification.

4. The process of claim 1, 2 or 3, wherein the α-Al$_2$O$_3$ is pretreated with a metal nitrate solution which contains excess nitric acid.

* * * * *